(12) United States Patent
Omura et al.

(10) Patent No.: US 12,048,956 B2
(45) Date of Patent: Jul. 30, 2024

(54) METHOD OF RECOVERING THE FLY ASH

(71) Applicant: TOKUYAMA CORPORATION, Shunan (JP)

(72) Inventors: Kohei Omura, Shunan (JP); Takuya Seki, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 880 days.

(21) Appl. No.: 17/256,876

(22) PCT Filed: Jun. 4, 2019

(86) PCT No.: PCT/JP2019/022215
§ 371 (c)(1),
(2) Date: Dec. 29, 2020

(87) PCT Pub. No.: WO2020/008783
PCT Pub. Date: Jan. 9, 2020

(65) Prior Publication Data
US 2021/0252568 A1  Aug. 19, 2021

(30) Foreign Application Priority Data
Jul. 2, 2018 (JP) .................... 2018-125702

(51) Int. Cl.
*B09B 3/40* (2022.01)
*B07B 1/46* (2006.01)
*B09B 101/30* (2022.01)

(52) U.S. Cl.
CPC .............. *B09B 3/40* (2022.01); *B07B 1/4609* (2013.01); *B09B 2101/30* (2022.01)

(58) Field of Classification Search
CPC ...... B09B 2101/30; B09B 3/40; B07B 1/4609
See application file for complete search history.

(56) References Cited

U.S. PATENT DOCUMENTS

| | | |
|---|---|---|
| 5,996,808 A | 12/1999 | Levy et al. |
| 2004/0033184 A1* | 2/2004 | Greer ................. C04B 18/08 423/215.5 |
| 2019/0233331 A1 | 8/2019 | Omura et al. |

FOREIGN PATENT DOCUMENTS

| | | |
|---|---|---|
| JP | 7-155740 A | 6/1995 |
| JP | 10-45444 A | 2/1998 |

(Continued)

OTHER PUBLICATIONS

Zhao, et al, Characterization of Residual Carbon in Fly Ashes from Power Plants Firing Biomass, Energy and Fuels, 2013, 27, 898-907 (Year: 2013).*

(Continued)

*Primary Examiner* — Anthony J Zimmer
*Assistant Examiner* — Eric Scott Sherman
(74) *Attorney, Agent, or Firm* — Birch, Stewart, Kolasch & Birch, LLP

(57) ABSTRACT

A method of recovering fly ash, including a firing step in which raw fly ash powder containing unburned carbon is fired to remove the unburned carbon by burning; measuring the content of unburned carbon in the raw fly ash powder; and obtaining a fine fly ash powder which is a component under a sieve and has a decreased content of unburned carbon as a result of sieve-classifying the raw fly ash powder. The perforation size of the sieve used in the sieve-classifying step is set depending upon the content of unburned carbon in the raw fly ash powder. The sieve has a small perforation size when the content of unburned carbon is large, and the sieve has a large perforation size when the content of unburned carbon is small. The fine fly ash powder, which is the component under the sieve, is recovered through the firing step.

6 Claims, 2 Drawing Sheets

(56) References Cited

FOREIGN PATENT DOCUMENTS

| | | |
|---|---|---|
| JP | 11-60299 A | 3/1999 |
| JP | 2008-126117 A | 6/2008 |
| JP | 4599540 B2 | 12/2010 |
| JP | 2017-29942 A | 2/2017 |
| WO | WO 2018/008513 A1 | 1/2018 |

OTHER PUBLICATIONS

Extended European Search Report for corresponding European Application No. 19831231.6, dated Feb. 15, 2022.
International Search Report for PCT/JP2019/022215 mailed on Aug. 27, 2019.
Chinese Office Action for corresponding Chinese Application No. 201980043142.7, dated Dec. 3, 2021.

* cited by examiner

METHOD OF RECOVERING THE FLY ASH

TECHNICAL FIELD

This invention relates to a method of recovering the fly ash. More specifically, the invention relates to a method of efficiently recovering the reformed fly ash having a decreased content of unburned carbon.

BACKGROUND ART

When the fly ash is used as an admixture with the cement or as an admixture with the concrete (both of which are hereinafter referred to as admixture), it is, usually, desired that the content of unburned carbon is better small in the fly ash.

In general, however, the fly ashes generated from the coal burning thermal power plants contain the unburned carbon in various amounts, say, about 15% by mass at the greatest. Therefore, only some of the fly ashes can be used as the admixture.

To obtain the fly ash containing the unburned carbon in small amounts, there have been proposed methods by which the fly ash is fired and the unburned carbon is removed by burning as disclosed in, for example, patent documents 1 to 3.

The method of removing the unburned carbon by firing the fly ash, however, is accompanied by such a problem that the operating conditions have to be varied depending upon the content of unburned carbon in the fly ash that is the raw material. For instance, the patent document 3 describes a method of maintaining a stable operation by using an externally heated rotary kiln and suitably varying the rate of feeding the raw material and the rate of feeding a fuel gas.

Concretely speaking, the firing conditions (e.g., rate of feeding the raw material, rate of feeding oxygen, heating temperature, heating time, etc.) suited for burning the unburned carbon to a sufficient degree may differ depending on the fly ash having a large content of unburned carbon and the fly ash having a small content of unburned carbon. When, for example, the content of unburned carbon is large, it becomes necessary to decrease the rate of feeding the raw material, increase the rate of feeding oxygen and lengthen the heating time. On the other hand, when it is attempted to heat the fly ash having a small content of unburned carbon under the same conditions as those for the fly ash having a large content of unburned carbon, then the result would be an increased disadvantage in economy. Therefore, it is difficult to treat all kinds of raw materials under the same conditions, and the operating conditions have to be varied each time to handle the raw materials containing the unburned carbon in various amounts.

Despite of saying that the operating conditions would have to be varied, however, the heating temperature for removing the unburned carbon by burning is very high (e.g., not lower than 700° C.), and it is not easy to vary the operating conditions. For example, the heat balance in the furnace is liable to be easily lost at a moment of changing over the raw material often causing the temperature to be excessively elevated or lowered. There, further, occurs a problem in that oxygen becomes in short supply temporarily and the amount of the unburned carbon does not decrease to a sufficient degree. Moreover, if the raw material is changed over too frequently, the control operation fails to follow up the change-over of the raw material. As a result, it may often become almost impossible to obtain the product that can be favorably used as an admixture.

PRIOR ART DOCUMENTS

Patent Documents

Patent document 1: Japanese Patent Laid-Open No. 2008-126117
Patent document 2: Japanese Patent Laid-Open No. 11-060299
Patent document 3: Japanese Patent Laid-Open No. 2017-029942

OUTLINE OF THE INVENTION

Problems that the Invention is to Solve

It is, therefore, an object of the present invention to provide a method of recovering the fly ash, which makes it possible to decrease the content of unburned carbon in the raw fly ash powder under predetermined firing conditions, reduce the burden resulting from varying the firing conditions, and stably recover the reformed fly ash having a decreased content of unburned carbon.

Means for Solving the Problems

The present inventors have studied the method of decreasing the content of unburned carbon in the raw fly ash powder. As a result, the inventors have paid attention to that the content of unburned carbon can be decreased by sieving the raw fly ash powder and that the content of unburned carbon can be controlled by adjusting the perforation size of the sieve. The inventors, therefore, have considered that the raw fly ashes containing the unburned carbon in various amounts can be treated to contain the unburned carbon in a predetermined amount if the perforation size of the sieve is adjusted, and have completed the invention.

According to the present invention, there is provided a method of recovering fly ash, including a firing step in which raw fly ash powder containing an unburned carbon is fired to remove the unburned carbon by burning, characterized by further including:

a measuring step of, measuring a content of said unburned carbon in the raw fly ash powder; and
 a sieve-classifying step of obtaining a fine fly ash powder which is a component under a sieve and has a decreased content of said unburned carbon as a result of sieve-classifying the raw fly ash powder; wherein
 a perforation size of the sieve used in the sieve-classifying step is set depending upon the content of unburned carbon in the raw fly ash powder, the sieve having a small perforation size being used when the content of unburned carbon is large and the sieve having a large perforation size being used when the content of unburned carbon is small; and
 a fine fly ash powder which is the component under the sieve is recovered through the firing step.

The following means can be preferably employed for the method of recovering the fly ash of the present invention.

(1) The sieve used in the sieve-classifying step is set to be the one having a perforation size in a range of 20 to 90 μm depending upon the content of unburned carbon in the raw fly ash powder;

(2) A threshold value $A_1$ is set for a content of unburned carbon in the raw fly ash powder, and there are, further, included:

the step which executes the sieve classification for the raw fly ash powder that has a content of unburned carbon larger than the threshold value $A_1$, and recovers the obtained fine powder which is the component under the sieve through the firing step; and the step which recovers the raw fly ash powder having a content of unburned carbon not larger than the threshold value $A_1$ through the firing step;

(3) The threshold value $A_1$ is set to lie in a range of 2 to 6% by mass;

(4) There is, further, included the step in which:

a threshold value $A_0$ smaller than the threshold value $A_1$ is, further, set for a content of unburned carbon in the raw fly ash powder;

the raw fly ash powder having a content of unburned carbon not larger than the threshold value $A_0$ is recovered as it is without executing the firing; and the raw fly ash powder having a content of unburned carbon larger than the threshold value $A_0$ but not larger than the threshold value $A_1$ is recovered through the firing step;

(5) The threshold value $A_0$ is set to lie in a range of not larger than 5% by mass under a condition that the threshold value $A_0$ is smaller than the threshold value $A_1$; and (6) The coarse powder which is the component on the sieve obtained through the sieve classification is recovered as it is without through the firing step.

Effects of the Invention

Even when it is attempted to handle, as raw materials, the fly ashes containing the unburned carbon in various amounts, the present invention sieves the fly ashes in advance to homogenize the content of unburned carbon. In the subsequent step of firing for decreasing the content of unburned carbon, therefore, there is no need of varying the operating conditions, and it is allowed to efficiently recover the reformed fly ash that has a decreased content of unburned carbon.

MODES FOR CARRYING OUT THE INVENTION

<Raw Fly Ash Powder>

In the invention, the fly ash (raw fly ash powder) that is to be recovered stands for a fly ash that usually generates in the facilities that burn the coal, such as coal burning thermal power plants. The fly ash also includes a fly ash that generates after having burned the fuel other than the coal or any inflammable wastes together with the coal.

The fly ash contains the unburned carbon which is the unburned residue of carbon components, usually, in an amount of 1 to 15% by mass. The unburned carbon that is contained in large amounts, however, causes a problem when the fly ash is used as an admixture. Concretely speaking, the unburned carbon, when contained in large amounts, floats on the surfaces of the mortar or the concrete and may form darkened portions. There may, further, arise such a problem that chemicals like chemical blending agents are adsorbed by the unburned carbon.

That is, for the fly ash used as an admixture with the mortar or the concrete, it is a requirement that the unburned carbon is contained in a small amount. For instance, it has been stated that the ignition loss must be not more than 5% by mass in the case of the JIS type II fly ash. In practice, however, the unburned carbon has not been contained in a predetermined amount in the raw fly ash powder that generates from the coal burning facilities. Say, the raw fly ash powder may often contain the unburned carbon in amounts of about 15% by mass at the greatest. To obtain the fly ash having a small content of unburned carbon, therefore, attempts have been made to decrease the content of unburned carbon.

As described already, it was so far attempted to decrease the content of unburned carbon relying on the firing (e.g., heating at high temperatures). However, the conditions for optimum firing differ depending upon the content of unburned carbon. So far, therefore, the firing conditions or the operating conditions in the heating furnace have been varied depending upon the content of unburned carbon in the raw fly ash powder. The operating conditions, however, are not easy to vary. The present invention, therefore, attempts to efficiently recover the reformed fly ash having a small content of unburned carbon without varying the firing conditions. For this purpose, the invention recovers the fly ash by treating the raw fly ash powder according to flows that are described below.

<Basic Flow>

Figure 1:
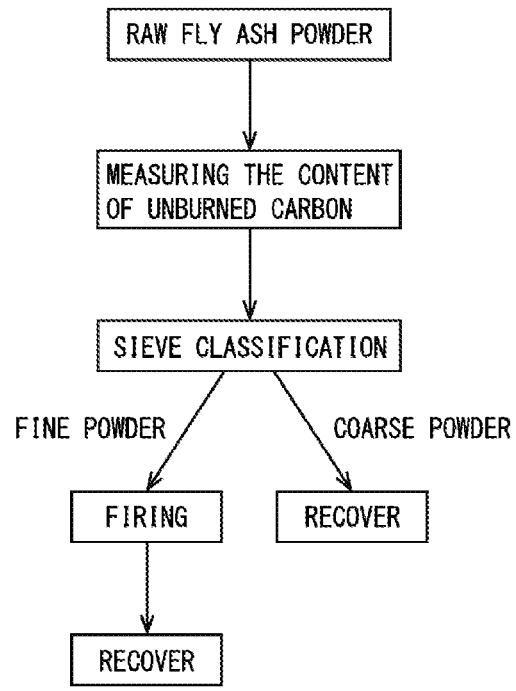
FIG. 1 It is a basic flow chart employed by a method of recovering the fly ash of the present invention.

Reference is now made to FIG. 1 which is a basic flow chart in the recovering method of the present invention. The invention measures the content of unburned carbon in the raw fly ash powder. Namely, since the optimum firing conditions are dependent upon the content of unburned carbon, the invention, first, grasps the content of unburned carbon to execute the firing under predetermined firing conditions.

Methods of measuring the content of unburned carbon have been known. For example, the following means can be employed though not limited thereto only.

(A) A method of detecting, relying on the infrared rays, the $CO_2$ CO gases generated by burning the raw fly ash powder;

(B) A method of measuring the ignition loss of the raw fly ash powder and estimating the content of unburned carbon from the ignition loss;

(C) A method that measures the amount of the Methylene Blue that is adsorbed and calculates the content of unburned carbon based on the adsorbed amount thereof;

(D) A method of calculation based on the bulk density testing; and (E) A method of estimating the content of unburned carbon by the irradiation with microwaves.

After having measured the content of unburned carbon, the raw fly ash powder is subjected to the sieve classification where the raw fly ash powder is classified into the powder that has a small content of unburned carbon and the powder that has a large content of unburned carbon.

Here, the fly ashes were sieve-classified into the components (fine powders) under the sieve and the components (coarse components) on the sieve. The contents of unburned carbon in the raw fly ash powders, perforation sizes of the sieves that were used and the contents of unburned carbon in the components under the sieve were measured to obtain the results as shown in Table 1 below.

TABLE 1

| | Contents of unburned carbon (% by mass) | | | |
|---|---|---|---|---|
| Sample No. | Raw powder | under the 90-μm sieve | under the 75-μm sieve | under the 45-μm sieve |
| No. 1 | 3.2 | 2.5 | 2.2 | 2.1 |
| No. 2 | 3.4 | 2.8 | 2.4 | 1.7 |
| No. 3 | 3.5 | 2.6 | 2.5 | 2.0 |
| No. 4 | 3.7 | 3.1 | 2.9 | 2.5 |
| No. 5 | 3.9 | 3.0 | 3.0 | 2.7 |
| No. 6 | 4.0 | 2.8 | 2.7 | 2.6 |
| No. 7 | 4.0 | 3.4 | 3.0 | 2.3 |
| No. 8 | 4.1 | 3.1 | 2.8 | 2.3 |
| No. 9 | 4.2 | 3.4 | 3.2 | 2.7 |
| No. 10 | 4.3 | 3.6 | 3.2 | 2.7 |
| No. 11 | 4.4 | 3.3 | 3.3 | 2.9 |
| No. 12 | 4.6 | 3.9 | 4.1 | 3.3 |
| No. 13 | 4.6 | 3.8 | 3.4 | 2.6 |
| No. 14 | 4.9 | 3.6 | 3.6 | 3.2 |
| No. 15 | 5.3 | 4.3 | 4.0 | 3.5 |
| No. 16 | 6.0 | 4.7 | 4.4 | 3.4 |
| No. 17 | 6.5 | 4.4 | 4.3 | 3.6 |
| No. 18 | 6.6 | 5.7 | 5.1 | 3.9 |
| No. 19 | 6.7 | 5.0 | 4.5 | 4.0 |
| No. 20 | 7.1 | 6.4 | 5.6 | 4.5 |
| No. 21 | 7.4 | 5.7 | 5.1 | 4.5 |
| No. 22 | 7.6 | 6.2 | 5.9 | 4.1 |
| No. 23 | 7.6 | 5.5 | 5.2 | 4.2 |
| No. 24 | 7.6 | 5.7 | 5.5 | 3.6 |
| No. 25 | 7.8 | 6.9 | 5.8 | 4.7 |
| No. 26 | 7.9 | 5.5 | 5.2 | 3.9 |
| No. 27 | 8.0 | 6.0 | 5.8 | 4.7 |
| No. 28 | 8.3 | 7.3 | 6.5 | 5.4 |
| No. 29 | 8.8 | 6.2 | 5.9 | 4.6 |
| No. 30 | 9.0 | 6.7 | 6.2 | 4.5 |
| No. 31 | 10.0 | 7.7 | 6.8 | 5.5 |
| No. 32 | 10.6 | 7.7 | 7.2 | 5.4 |

As will be understood from Table 1 which shows the results of measurements, the contents of unburned carbon in the fine powders (components under the sieve) are decreasing as compared to before being sieved, and much of the unburned carbon particles are distributed to the coarse powder side (components on the sieve). That is, when a sieve having a small perforation size is used, the content of unburned carbon decreases and there can be recovered a fly ash having a content of unburned carbon that is always not larger than a predetermined value. The smaller the perforation size, however, the smaller the yield of fine powder, the lower the treating capacity, and the lower the durability of the sieve.

According to the present invention, therefore, the sieve classification is conducted by setting the perforation size of the sieve used in the sieve classification depending upon the content of unburned carbon in the raw fly ash powder. That is, when the content of unburned carbon is large, the sieve having a small perforation size is used and when the content of unburned carbon is small, the sieve having a relatively large perforation size is used to conduct the sieve classification. It is thus made possible to efficiently obtain the component (fine powder) under the sieve that has a content of unburned carbon that is not larger than a predetermined value at all times. Upon firing the fine powder, therefore, there can be recovered a reformed fly ash having a greatly decreased content of unburned carbon without the need of varying the firing conditions. What is described above constitutes the basic principle of the present invention.

In the present invention, no specific limitation is imposed on the method of sieve classification and any known technology can be utilized. For example, there have been employed on an industrial scale a method of the type that executes the sieving by utilizing vibration, a method of the type that executes the sieving by utilizing ultrasonic waves and a method of the type that executes the sieving while permitting the raw material to pass through the sieve accompanying the air stream. In the invention, there can be employed the sieve classification based upon any of the above methods.

By taking into consideration the fact that the content of unburned carbon in the raw fly ash powder varies over a range of about 1 to about 15% by mass, it is desired in the invention that the perforation size of the sieve should lie in a range of 20 to 90 μm in order to achieve the object of conducting the firing under predetermined firing conditions at all times.

It is, further, allowable to finely vary the perforation size depending upon the content of unburned carbon in the raw fly ash powder. Usually, however, the object of the present invention can be fully achieved by using two or three kinds of sieves having perforation sizes lying within the above-mentioned range.

For example, when it is attempted to obtain a component (fine powder) under the sieve having a content of unburned carbon of not more than 6% by mass, there can be preferably used the sieves having perforation sizes lying in the below-mentioned ranges depending upon the content of unburned carbon in the raw fly ash powder that is to be sieved.

| Content of unburned carbon in the raw powder | Sieve perforation size |
|---|---|
| 9% by mass or less | 75 to 90 μm |
| 6 to 11% by mass | 45 to 75 μm |
| 11% by mass or more | 20 to 45 μm |

The component under the sieve obtained through the sieve classification, i.e., the fine powder, has a content of unburned carbon that is not more than a predetermined value. As illustrated in FIG. 1, therefore, the fine powder is subjected to the firing. Through the firing, the unburned carbon is removed upon being burned, and the content of unburned carbon further decreases.

No specific limitation is imposed on the firing means, and any known technology can be suitably selected and employed to remove by firing the unburned carbon contained in the fly ash.

As the heating furnace for firing, for example, there can be used a rotary kiln, a swirl flow type firing furnace or a fluidized bed furnace.

As for the firing conditions, for example, the heating temperature, heating time and filling rate in the furnace are so set that the content of unburned carbon can be decreased down to become equivalent to or lower than that of the ash of the JIS type II, i.e., the content of unburned carbon is not more than 3% by mass and, specifically, not more than 2% by mass. Concretely speaking, the heating temperature is set to be 700 to 1000° C. and, specifically, 750 to 950° C. The heating time and the filling rate are set depending on the heating temperature. As the content of unburned carbon becomes large, the heating temperature to be set becomes high, the filling rate to be set becomes low and the heating time to be set becomes long. The unburned carbon generates the heat in the furnace. Therefore, the temperature in the furnace varies depending upon the content of unburned carbon in the fly ash that is fired. According to the present invention, however, the content of unburned carbon in the fly ash has been decreased in advance relying on the sieve classification. Therefore, heat is not generated so much and the heat treatment can be executed with ease within the above-mentioned temperature range.

The reformed fly ash having a content of unburned carbon decreased through the firing treatment is, usually, cooled and is then recovered. The cooling may be either the indirect cooling or the direct cooling, through which the temperature is, usually, cooled down to not higher than 200° C. and, preferably, not higher than 100° C. Finally, the temperature is naturally cooled down to around room temperature to put the reformed fly ash into use.

As described above, the reformed fly ash having a decreased content of unburned carbon is preferably used as an admixture with the cement or as an admixture with the concrete.

In the invention, further, the component on the sieve obtained through the sieve classification, i.e., the coarse powder, has a considerably increased content of unburned carbon. The fly ash of this kind can be separately subjected to the firing to decrease the content of unburned carbon. In this case, however, the fly ash must be fired under the conditions that are considerably different from the firing conditions set for firing the above fine powder bringing about, therefore, disadvantage in economy. From the economical point of view, therefore, the fly ash is better recovered as it is and is used as a raw material for producing the cement clinker.

<Preferred Flow>

In the basic flow described above, the raw fly ash powders are all subjected to the sieve classification. It is, however, desired that only some of the raw fly ash powders are subjected to the sieve classification to reduce the burden exerted on the sieve classification.

Figure 2:
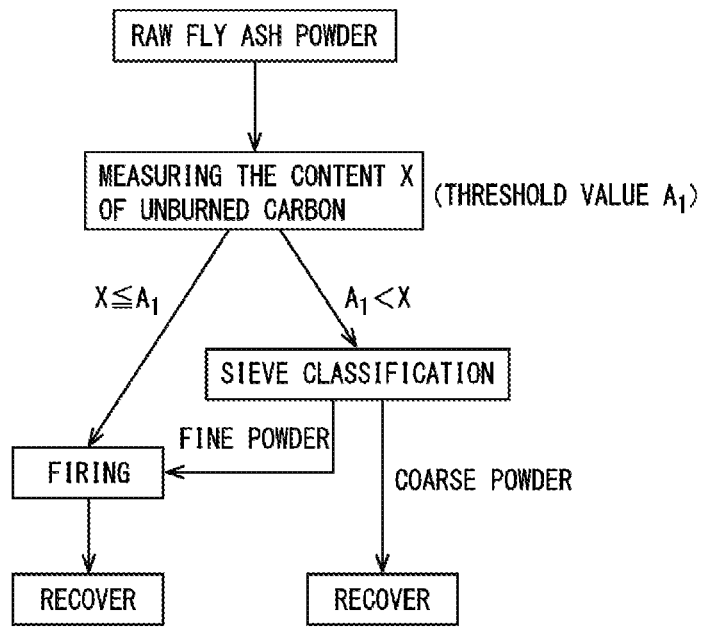
FIG. 2 It is a preferred flow chart used in the method of recovering the fly ash of the present invention.

As described already, the raw fly ash powders have contents of unburned carbon of about 1 to about 15% by mass, and not so few kinds of raw fly ash powders have smaller contents of unburned carbon. Referring to FIG. 2, therefore, a predetermined threshold value $A_1$ is set for a content of unburned carbon, and the raw fly ash powder having a content of unburned carbon X in excess of the threshold value $A_1$ (i.e., $A_1<X$) is subjected to the sieve classification while the raw fly ash powder having the content of unburned carbon X not larger than the threshold value $A_1$ (i.e., $X \le A_1$) is not subjected to the sieve classification but is directly brought into the firing treatment. Namely, of the raw fly ash powder having the content of unburned carbon X in excess of the threshold value $A_1$, the component under the sieve (fine powder) has a decreased content of unburned carbon which is closer to the content of unburned carbon of not larger than the threshold value $A_1$ in the raw fly ash powder. Therefore, the fine powder can be fired under the same firing conditions as those for the raw fly ash powder of not larger than the threshold value $A_1$ and also can be fired being mixed with the raw fly ash powder of not larger than the threshold value $A_1$.

In this embodiment, the threshold value $A_1$ for the content of unburned carbon X is, desirably, set to lie in a range of 2 to 6% by mass and, specifically, 4 to 6% by mass. When the threshold value $A_1$ is small, for example, the unburned carbon can be efficiently removed by firing accompanied, however, by not only an increase in the amount of the raw fly ash powder subjected to the sieve classification but also by a decrease in the perforation size of the sieve that is used. From a balance between the efficiency for removing the unburned carbon by firing and the efficiency of sieve classification, therefore, it is desired that the threshold value $A_1$ is set to lie in the above-mentioned range.

The reformed fly ash obtained through the firing described above is suitably cooled, recovered and is desirably used as an admixture like in the case of the basic flow.

Further, the component on the sieve (coarse powder) obtained by subjecting the raw fly ash powder of in excess of the threshold value $A_1$ to the sieve classification, is desirably recovered as it is and is used as a raw material for producing the cement clinker like in the case of the basic flow.

<Other Flows>

Figure 3:
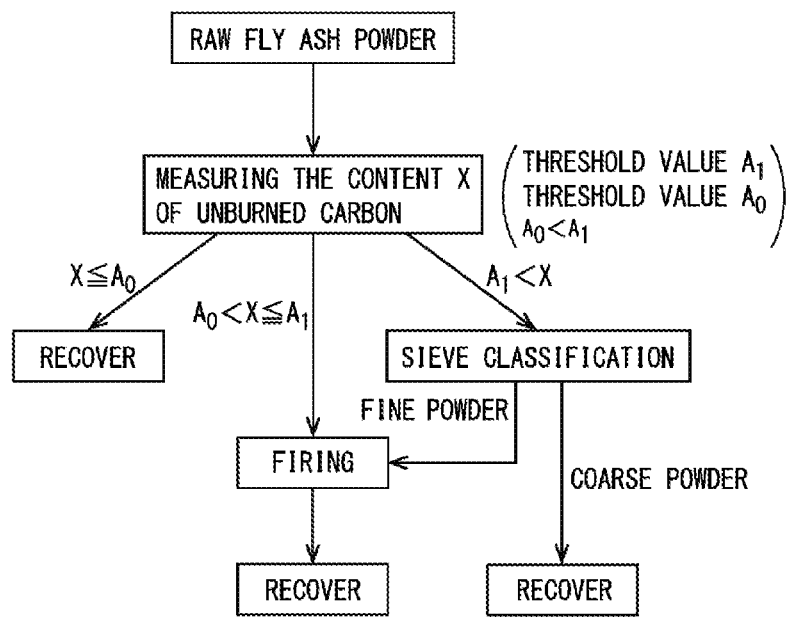
FIG. 3 It is another flow chart used in the method of recovering the fly ash of the present invention.

In the embodiment illustrated in FIG. 2 above, the threshold value $A_1$ is set for the content of unburned carbon A. In the invention, further, it is allowable to set another threshold value $A_0$ in a range smaller than the threshold value $A_1$. FIG. 3 is a flow chart of when the threshold value $A_0$ ($A_0<A_1$) is set in addition to the threshold value $A_1$. In this embodiment as illustrated in FIG. 3, the recovery operation is carried out as described below depending upon the content of unburned carbon X.

When $X \le A_0$;

The raw fly ash powder is recovered as it is without being fired.

When $A_0<X \le A_1$;

The raw fly ash powder is fired and is recovered like the raw fly ash powder in the case of when $X \le A_1$ in FIG. 2.

When $A_1<X_1$;

The raw fly ash powder is sieve-classified like in the case of the flow of FIG. 2. The fine powder which is the component under the sieve is fired and is recovered. The coarse powder which is the component on the sieve is recovered as it is without being fired.

Namely, the JIS type II fly ash has been stated for its ignition loss to be not more than 5% by mass. Therefore, the fly ash having the content of unburned carbon which is not more than a predetermined value can be used as it is as an admixture without the need of decreasing the content of unburned carbon and without any problem. Therefore, though this embodiment permits an increase in the number of patterns for treating the raw fly ash powder, the advantage is that the consumption of the thermal energy can be decreased owing to the additional pattern which inhibits the firing by setting the threshold value $A_0$ in the range which is smaller than the threshold value $A_1$.

In the above embodiment, therefore, the threshold value $A_0$ that must be smaller than the range of the threshold value $A_1$ should, desirably, be set to be not more than 5% by mass, preferably, not more than 3% by mass and, more preferably, not more than 2% by mass by taking the provisions of the JIS type II into consideration.

The fly ash having the content of unburned carbon not larger than the threshold value $A_0$ that is recovered without being fired can be used as it is as an admixture or can be put to the use of admixture being admixed with the reformed fly ash that has a decreased content of unburned carbon after having been fired.

EXAMPLES

The present invention will now be described more concretely by way of Examples to which only, however, the invention is in no way limited.

In the following Reference Example and Working Example, the contents of unburned carbons were measured in compliance with the ignition loss testing method specified under the JIS A 6201.

<Reference Example>

There was provided a raw fly ash powder A having a content of unburned carbon of 3.4% by mass generated in a coal burning thermal power plant in Japan.

By using an externally heated rotary kiln, the raw fly ash powder A was heat-treated (fired) under the conditions of a filling rate of 10%, a temperature of 780° C. and a heating time of 15 minutes. After the heating, the content of unburned carbon could be decreased down to 1.3% by mass.

There was also provided a raw fly ash powder B having a content of unburned carbon of 11.7% by weight.

The raw fly ash powder B was fired at a temperature of 780° C. just like the above raw fly ash powder. Here, however, since the content of unburned carbon was large, the filling rate was lowered down to 8% and the heating time was lengthened to 20 minutes. Despite of this, however, the content of unburned carbon after the heating could only be decreased down to 4.1% by mass.

Therefore, the filling rate was, further, lowered down to 4%, and the raw fly ash powder was heated. In this case, the content of unburned carbon after the heating could be deceased down to 1.6% by mass.

From the above results, it was learned that for the fly ash having a large content of unburned carbon, the filling rate had to be lowered or the heating time had to be lengthened (i.e., the heating conditions had be varied). Otherwise, the content of unburned carbon could not be lowered by the heating down to a level comparable to that of the raw fly ash that possessed a small content of unburned carbon since before being heated.

Here, it is expected that the content of unburned carbon in the fly ash A, too, can be decreased down or less than 1.3% by mass if it is fired under the condition of a filling rate of 4% and a heating time of 20 minutes. Under such heating conditions, however, the amount that can be treated decreases and the efficiency becomes poor.

<Example>

Next, described below is the effect for decreasing the contents of unburned carbon by sieving the fly ashes.

There were provided raw fly ash powders (Samples Nos. 1 to 32) generated from the coal burning thermal plants in Japan. The raw fly ash powders were then subjected to the sieving with perforation sizes of 90 μm, 75 μm and 45 μm to recover fine powders that were the components under the sieves.

The contents of unburned carbon in the samples or the raw fly ash powders and in the fine powders under the sieves were as shown in Table 1 above.

From the results of Table 1, it was learned that the contents of unburned carbon were decreased in the fine powders that were obtained by sieving the raw fly ash powders. It was also learned that the contents of unburned carbon were decreased with a decrease in the perforation size.

When the sieve with the perforation size of 90 μm was used, it was probable that the contents of unburned carbon in the components under the sieve could be decreased down to be not more than 6% by mass provided the contents of unburned carbon were about 9% by mass in the raw fly ash powders. In some cases, however, the contents of unburned carbon in the fine powders could not be decreased down to not more than 6% by mass despite the contents of unburned carbon were not more than 9% by mass in the raw fly ash powders.

When the sieve with the perforation size of 75 μm was used, the contents of unburned carbon in the components under the sieve could all be decreased down to not more than 6% by mass provided the contents of unburned carbon were not more than 9% by weight in the fly ashes.

Further, when the sieve with the perforation size of 45 μm was used, the contents of unburned carbon could be decreased down to not more than 6% by mass in the fine powders from all of the raw fly ash powders that were put to the test.

Namely, if it is presumed that the contents of unburned carbon are set to be not more than 6% by mass and there are used three kinds of sieves with the perforation sizes of 90 μm, 75 μm and 45 μm, then the sieve with the perforation size of 90 μm can be used for the raw fly ash powders having the contents of unburned carbon of not more than 8% by mass, the sieve with the perforation size of 75 μm can be used for the raw fly ash powders having the contents of unburned carbon of more than 7% by mass but not more than 9% by mass and the sieve with the perforation size of 45 μm can be used for the raw fly ash powders having the contents of unburned carbon of more than 9% by mass. In this case, it will be learned that the fly ashes having the contents of unburned carbon of not more than 6% by mass can be recovered maintaining stability. Here, when only two kinds of sieves are to be used, the one sieve will have the perforation size of 75 μm and the another sieve will have the perforation size of 45 μm to achieve the target of not more than 6% by mass.

The invention claimed is:

1. A method of recovering fly ash, including a firing step in which raw fly ash powder containing an unburned carbon is fired to remove the unburned carbon by burning, characterized by further including:
   a measuring step of measuring a content of said unburned carbon in said raw fly ash powder; and
   a sieve-classifying step of obtaining a fine fly ash powder which is a component under a sieve and has a decreased content of said unburned carbon as a result of sieve-classifying said raw fly ash powder; wherein
   a perforation size of the sieve used in said sieve-classifying step is set depending upon the content of unburned carbon in the raw fly ash powder,
   if a content of unburned carbon is 6% by mass or less, then the sieve having a perforation size of 75 to 90 μm is used;
   if a content of unburned carbon is 6% to 11% by mass, then the sieve having a perforation size of 45 to 75 μm is used;
   if a content of unburned carbon is 11% by mass or more, then the sieve having a perforation size of 20 to 45 μm is used; and
   a fine fly ash powder which is the component under the sieve is recovered through said firing step.

2. A method of recovering fly ash, including a firing step in which raw fly ash powder containing an unburned carbon is fired to remove the unburned carbon by burning, further comprising:
   a measuring step of measuring a content of said unburned carbon in said raw fly ash powder; wherein a threshold value $A_1$ is set for a content of unburned carbon in said raw fly ash powder;
   recovering the raw fly ash powder having a content of unburned carbon not larger than said threshold value $A_1$ through the firing step;
   for the raw fly ash powder that has a content of unburned carbon larger than said threshold value $A_1$, a sieve-classifying step is performed of obtaining a fine fly ash powder which is a component under a sieve and has a decreased content of said unburned carbon as a result of sieve-classifying said raw fly ash powder; wherein a perforation size of the sieve used in said sieve-classifying step is set depending upon the content of unburned carbon in the raw fly ash powder, if a content of unburned carbon is 6% by mass or less, then the sieve having a perforation size of 75 to 90 μm is used;

if a content of unburned carbon is 6% to 11% by mass, then the sieve having a perforation size of 45 to 75 μm is used;

if a content of unburned carbon is 11% by mass or more, then the sieve having a perforation size of 20 to 45 μm is used;

and recovers the obtained fine powder which is the component under the sieve through said firing step.

3. The method of recovering the fly ash according to claim 2, wherein said threshold value $A_1$ is set to lie in a range of 2 to 6% by mass.

4. A method of recovering fly ash, including a firing step in which raw fly ash powder containing an unburned carbon is fired to remove the unburned carbon by burning, further comprising:

a measuring step of measuring a content of said unburned carbon in said raw fly ash powder; wherein a threshold value $A_1$ is set for a content of unburned carbon in said raw fly ash powder; a threshold value $A_0$ smaller than said threshold value $A_1$ is, further, set for a content of unburned carbon in said raw fly ash powder;

recovering the raw fly ash powder having a content of unburned carbon not larger than the threshold value $A_0$ as it is without executing the firing;

recovering the raw fly ash powder having a content of unburned carbon larger than said threshold value $A_0$ but not larger than said threshold value $A_1$ through said firing step; and for the raw fly ash powder that has a content of unburned carbon larger than said threshold value $A_1$, a sieve-classifying step is performed of obtaining a fine fly ash powder which is a component under a sieve and has a decreased content of said unburned carbon as a result of sieve-classifying said raw fly ash powder; wherein a perforation size of the sieve used in said sieve-classifying step is set depending upon the content of unburned carbon in the raw fly ash powder, if a content of unburned carbon is 6% by mass or less, then the sieve having a perforation size of 75 to 90 μm is used;

if a content of unburned carbon is 6% to 11% by mass, then the sieve having a perforation size of 45 to 75 μm is used;

if a content of unburned carbon is 11% by mass or more, then the sieve having a perforation size of 20 to 45 μm is used;

and recovers the obtained fine powder which is the component under the sieve through said firing step.

5. The method of recovering the fly ash according to claim 4, wherein said threshold value $A_0$ is set to lie in a range of not larger than 5% by mass under a condition that said threshold value $A_0$ is smaller than said threshold value $A_1$.

6. The method of recovering the fly ash according to claim 1, wherein the coarse powder which is the component on the sieve obtained through said sieve classification is recovered as it is without through the firing step.

* * * * *